US008014529B2

(12) United States Patent
Koren et al.

(10) Patent No.: US 8,014,529 B2
(45) Date of Patent: Sep. 6, 2011

(54) IN-BAND DEVICE ENROLLMENT WITHOUT ACCESS POINT SUPPORT

(75) Inventors: Yuval Koren, San Francisco, CA (US); Earl T. Cohen, Oakland, CA (US); Eugene M. Feinberg, Sunnyvale, CA (US); Berend Ozceri, Sunnyvale, CA (US)

(73) Assignee: Eye-Fi, Inc., Mountain View, CA (US)

( * ) Notice: Subject to any disclaimer, the term of this patent is extended or adjusted under 35 U.S.C. 154(b) by 1207 days.

(21) Appl. No.: 11/465,678

(22) Filed: Aug. 18, 2006

(65) Prior Publication Data

US 2008/0046545 A1 Feb. 21, 2008

(51) Int. Cl.
*H04K 1/00* (2006.01)
*H04M 1/66* (2006.01)

(52) U.S. Cl. ......... 380/280; 455/410; 455/411; 713/170
(58) Field of Classification Search .................... 380/270
See application file for complete search history.

(56) References Cited

U.S. PATENT DOCUMENTS

| 5,389,934 | A | | 2/1995 | Kass |
| 5,673,318 | A | * | 9/1997 | Bellare et al. ................ 713/170 |
| 5,712,679 | A | | 1/1998 | Coles |
| 5,765,027 | A | | 6/1998 | Shi et al. |
| 5,876,218 | A | | 3/1999 | Burnett et al. |
| 6,405,278 | B1 | | 6/2002 | Liepe |
| 7,107,378 | B1 | | 9/2006 | Brewer |
| 7,111,022 | B1 | | 9/2006 | Matsumoto et al. |
| 7,153,909 | B2 | | 12/2006 | Van Dun et al. |
| 7,440,774 | B2 | | 10/2008 | Croome |
| 7,503,065 | B1 | | 3/2009 | Packingham et al. |
| 7,609,837 | B2 | * | 10/2009 | Bennett .......................... 380/262 |
| 2001/0022621 | A1 | | 9/2001 | Squibbs |
| 2001/0032335 | A1 | | 10/2001 | Jones |
| 2002/0082048 | A1 | | 6/2002 | Toyoshima |
| 2003/0128272 | A1 | | 7/2003 | Clough et al. |

(Continued)

FOREIGN PATENT DOCUMENTS

EP   1 404 105 A2   3/2004

(Continued)

OTHER PUBLICATIONS

Eye-Fi, Inc., PCT/US2006/034939 Filed Sep. 7, 2006, International Search Report and Written Opinion, International Searching Authority-EP, mailed Nov. 27, 2007-19 pp.

(Continued)

*Primary Examiner* — Taghi Arani
*Assistant Examiner* — Mohammad Rahman
(74) *Attorney, Agent, or Firm* — SNR Denton US LLP

(57) ABSTRACT

In one embodiment, the invention provides a method for configuring a wireless device, so as to enable the wireless device to join a secured wireless network, by broadcasting a series of broadcast packets encoding a network configuration parameter (e.g., a shared secret key) from a computer coupled to a wireless access point to the wireless device. The information representing the network configuration parameter is encoded, not within the payload portion of the packet, but within the length of each broadcast packet in the series of broadcast packets. Accordingly, a wireless device that has not yet been configured to receive packets from the wireless access point can observe the information encoded in the length of each broadcast packet, and thereby decode the network configuration parameter and join the network.

57 Claims, 8 Drawing Sheets

U.S. PATENT DOCUMENTS

| | | | |
|---|---|---|---|
| 2003/0144029 A1 | 7/2003 | Wu | |
| 2004/0168081 A1* | 8/2004 | Ladas et al. | 713/201 |
| 2004/0253969 A1* | 12/2004 | Nguyen et al. | 455/515 |
| 2004/0266480 A1 | 12/2004 | Hjelt et al. | |
| 2005/0033848 A1 | 2/2005 | Croome | |
| 2005/0130728 A1 | 6/2005 | Nguyen et al. | |
| 2005/0134707 A1 | 6/2005 | Perotti et al. | |
| 2005/0235086 A1 | 10/2005 | Mills et al. | |
| 2005/0262223 A1* | 11/2005 | Kimura | 709/220 |

FOREIGN PATENT DOCUMENTS

| | | |
|---|---|---|
| EP | 1 465 420 A | 10/2004 |
| WO | 00/67128 A | 11/2000 |
| WO | 01/45388 A2 | 6/2001 |
| WO | 02/19266 A | 3/2002 |
| WO | 03/088021 A2 | 10/2003 |

OTHER PUBLICATIONS

Anita Wilhelm et al.: "Photo Annotation on a Camera Phone"; School of Information Management and Systems, University of California, Berkeley; Helsinki Institute for Information Technology (HIIT); CHI2004, Apr. 24-29, 2004, Vienna, Austria; ACM 1-581 13-703-6, Jun. 4, 2004; pp. 1403-1406.

Nancy A. Van House et al.; "The Social Uses of Personal Photography: Methods for Projecting Future Imaging Applications"; Sep. 2004; pp. 1-12.

Nancy Van House et al.; From "What?" to "Why?? The Social Uses of Personal Photos"; School of Information Management and Systems, University of California at Berkeley; CSCW04, Nov. 6-10, 2004, Chicago, Ill.; Copyright 2004 ACM 1-581 13-810-5/04/0011; (10 pages).

Marc Davis et al.; "MMM2: Mobile Media Metadata for Media Sharing"; University of California at Berkeley School of Information Management and Systems; CHI2005, Apr. 2-7, 2005; ACM 1-59593-002-7/05/0004; (4 pages).

Nancy Van House et al.; "The Uses of Personal Networked Digital Imaging: An Empirical Study of Cameraphone Photos and Sharing"; University of California at Berkeley School of Information Management and Systems; CHI2005 Apr. 2-7; ACM 1-59593-0002-7/05/0004; (4 pages).

Nancy A. Van House et al.; "The Social Life of Cameraphone Images"; School of Information Management and Systems, University of California, Berkeley; Sep. 11, 2005; (4 pages).

Socket Communications, Inc., PCT/US2003/010532 Filed Apr. 8, 2003, International Search Report, International Searching Authority-EP, mailed Oct. 25, 2004- 7pages.

Croome, Martin; U.S. Appl. No. 60/370,682, filed Apr. 8, 2002; 7 pages.

Croome, Martin; U.S. Appl. No. 60/390,019, filed Jun. 19, 2002; 14 pages.

* cited by examiner

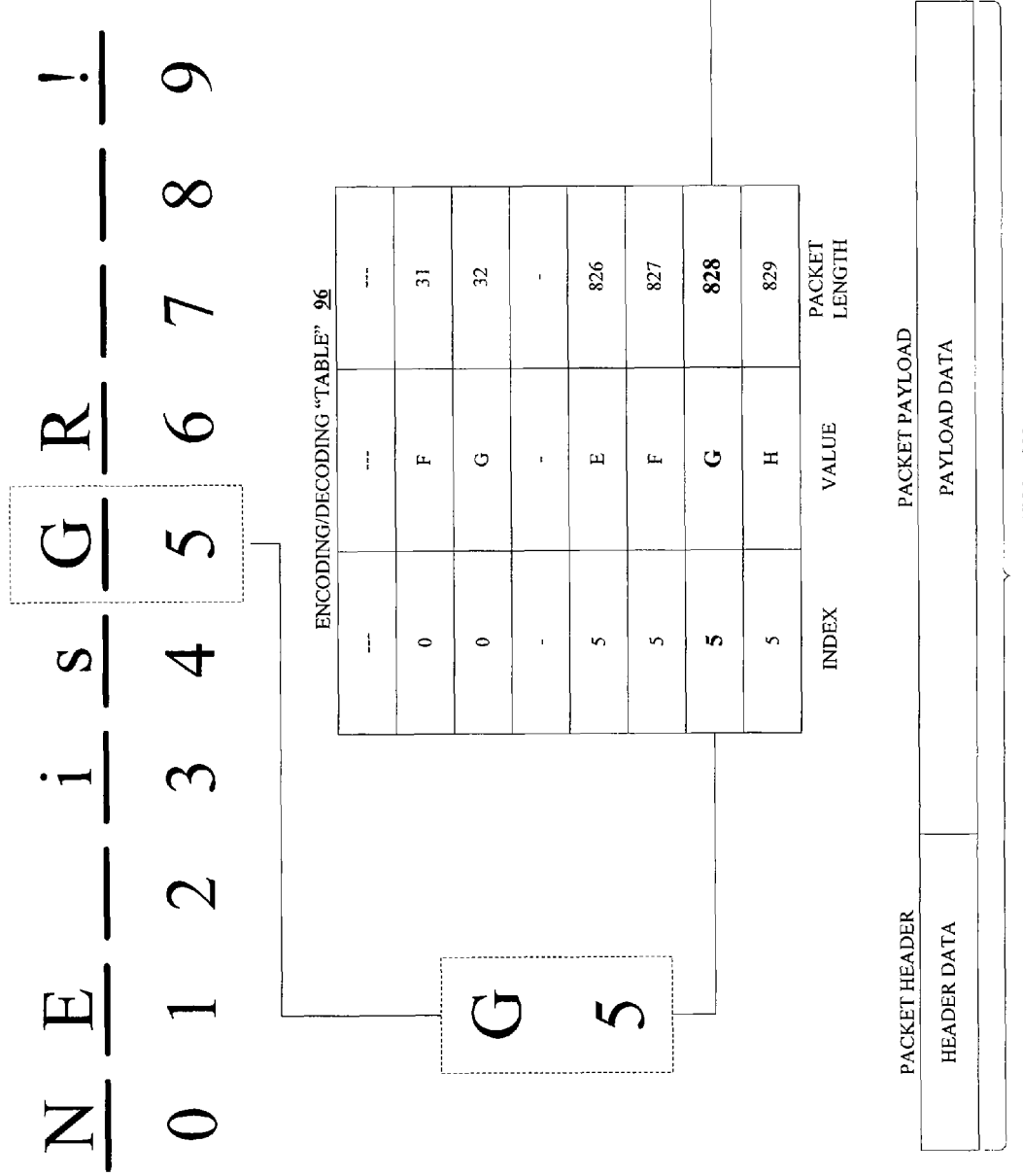

IN-BAND DEVICE ENROLLMENT WITHOUT ACCESS POINT SUPPORT

FIELD OF THE INVENTION

The present invention relates to wireless networks, and more particularly to methods and systems for configuring a wireless device to work with a secured wireless network.

BACKGROUND

Wireless networks, particularly those wireless networks that are compliant with one of the IEEE 802.11 a/b/g standards, are often secured so that unauthorized access to, and use of, the wireless network is prevented. A common method for securing wireless networks is to use a pre-shared secret key (or passphrase). For instance, pre-shared secret keys are commonly utilized in versions of WEP (Wired Equivalent Privacy), WPA (Wi-Fi Protected Access), and WPA2 (Wi-Fi Protected Access standardized in 802.11i) when implemented in home and small office networks. In general, a wireless network secured with a pre-shared secret key is protected against unauthorized use by preventing wireless devices that do not have access to the pre-shared secret key from joining, and communicating data over, the wireless network.

In order to add a wireless device to a wireless network secured with a pre-shared secret key, network configuration parameters including the pre-shared secret key must be input into the wireless device. One way this is achieved is by manually entering the network configuration parameters, for example, with a keyboard. However, on a mobile wireless device with limited input means (e.g., such as a camera, mobile phone, or personal digital assistant), entering network configuration parameters can be cumbersome, difficult or even impossible.

Because it can be difficult, if not impossible, to manually enter network configuration parameters into mobile wireless devices that have limited input means, alternative methods of configuring wireless devices have been developed. One such method involves coupling (e.g., with a Universal Serial Bus (USB) cable, or other wired connection) the wireless device to a computer, and then utilizing the computer to configure the wireless device. For example, as illustrated in FIG. 1, a camera 10 with wireless capabilities is connected by means of a wired connection 11 to a computer 12. The computer 12 is connected to a wireless access point 14, and a wide area network (WAN) 16 by means of a broadband routing device 18. Accordingly, a configuration application executing on the computer 12 may prompt a user to input (with the computer's keyboard) one or more network configuration parameters, which are then communicated over the wired connection 11 to the camera 10. Alternatively, the configuration application may automatically extract the required network configuration parameters from a network profile of the computer 12, and then communicate the network configuration parameters over the wired connection 11 to the camera 10, so as to enable the camera to join the wireless network and thereby gain access to the WAN 16.

An automated approach, such as that described above, may be advantageous in that it relieves unsophisticated users from understanding the details of network and device configuration. However, for the automated approach described above to work, the wireless device (e.g., camera 10) is required to have hardware and associated software to support a wired connection (e.g., a USB port). This may unnecessarily add to the complexity, cost and size of mobile wireless devices. This is particularly disadvantageous when a mobile wireless device is designed to normally operate un-tethered and communicate wirelessly.

In another method for configuring a wireless device, a computer is used to temporarily establish a wireless connection with a wireless device via an ad hoc network. For example, a user may manually configure the computer to establish an ad hoc wireless connection to the wireless device. In some cases, the user may execute a configuration application on the computer, causing the computer to automatically configure itself and establish an ad hoc network connection to the wireless device. Once connected, the user can utilize the computer to enter network configuration parameters and communicate the parameters to the wireless device, thereby enabling the wireless device to reconfigure itself and join a wireless network.

Although the above described method is advantageous in that it can be performed automatically, with little or no user input, the above described method is disruptive in that it causes the computer to reconfigure itself, for example, by disconnecting from a network in order to establish an ad hoc connection to the wireless device. Accordingly, the computer, and any applications executing on the computer that are dependent upon network connectivity, may temporarily become disconnected from a wide area network, such as the Internet. Many applications assume the existence of always-on connectivity and will often exhibit undesirable characteristics when network connectivity is disabled.

In yet another method for configuring a wireless device, the network configuration parameters are communicated wirelessly from an access point to the wireless device using special configuration protocols. The special configuration protocols communicate network configuration parameters in the payload portion of protocol specific data packets. For example, a technology referred to as "Simple Config," which is currently being developed and standardized by the Wi-Fi® Alliance, implements such a method. However, this type of configuration method only works when the access point is specifically configured with the appropriate software to support the technology. The large base of existing wireless access points do not provide support for the special communication protocols used to communicate network configuration parameters from an access point to a wireless device over a wireless communications channel.

SUMMARY OF THE INVENTION

In one embodiment, the present invention provides for configuring a wireless device for use on a secured wireless network. A computer, communicatively coupled to a wireless access point of a wireless network, executes a configuration application. The configuration application of the computer generates a series of broadcast packets encoding a network configuration parameter. Specifically, one or more broadcast packets in the series of broadcast packets encode a portion of a network configuration parameter in the lengths of the broadcast packets. The series of broadcast packets are communicated from the computer to the wireless access point, where they are wirelessly communicated to a wireless device. The wireless device, upon receiving a sufficient number of the broadcast packets in the series, decodes the network configuration parameter, and utilizes the network configuration parameter to authenticate and/or associate with a wireless network of the wireless access point.

Consistent with one embodiment of the invention, a network configuration parameter, such as a pre-shared secret key, is encoded in the lengths of broadcast packets. Depending upon the particular implementation, a portion of a network configuration parameter may be encoded in one, or more, broadcast packets. For example, in one embodiment of the invention, a configuration application executing on a computer formats each broadcast packet in a pair of broadcast packets from the series of broadcast packets to have a particular length, such that the lengths of two broadcast packets in a pair can be utilized by the wireless device to decode a portion of the network configuration parameter. The length of one broadcast packet in the pair indicates a value (e.g., a character) included in the network configuration parameter. The length of the other broadcast packet in the pair serves as an index "pointing to" or indicating the position of the value within the network configuration parameter. By combining portions of the network configuration parameter encoded in this manner, the wireless device is able to decode the network configuration parameter or parameters.

In one embodiment of the invention, the network configuration parameter may be encrypted with an encryption key shared between the configuration application executing on the computer and the wireless device. Accordingly, the configuration application executing on the computer may encrypt the network configuration parameter prior to encoding the network configuration parameter and broadcasting the broadcast packets. In addition, an error correction coding mechanism may be used to encode the network configuration parameter prior to encoding the network configuration parameter in the lengths of the broadcast packets. Accordingly, in one embodiment of the invention, the wireless device may derive the network configuration parameter from information received correctly only in a sufficient size subset of broadcast packets.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 8 depicts an example of a broadcast packet encoding, within the length of the broadcast packet, a portion of a network configuration parameter and an index indicating its position within the network configuration parameter, according to an embodiment of the invention.

DESCRIPTION

Figure 1:
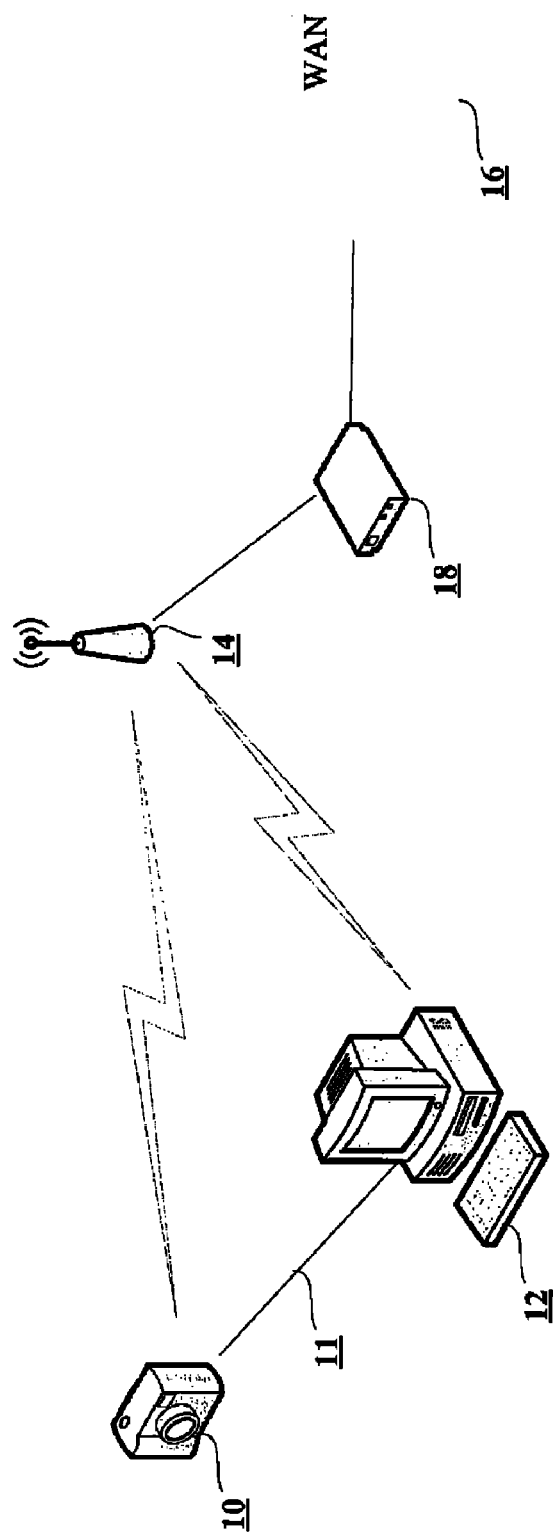
FIG. 1 illustrates a network environment, in which a conventional method of configuring a wireless device may be implemented.

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

In various embodiments, the present invention provides methods and systems for automatically configuring a wireless device for use with a wireless network (e.g., a wireless network compliant with IEEE 802.11 a/b/g) by wirelessly broadcasting one or more configuration parameters to the wireless device from a computer communicatively coupled to a wireless access point. By "communicatively coupled," it is meant that the computer is capable of communicating with the access point over a network. The particular configuration of the network may vary considerably without departing from the spirit of the invention. In particular, the computer from which the packets are broadcast may, but need not, be capable of wirelessly communicating with the wireless access point. In general, the broadcast packets are generated at the computer and communicated from the computer to the wireless access point before being wirelessly communicated from the access point to the wireless device. Furthermore, the computer need not be any particular type or model of computer, but can be any computing device capable of running the necessary configuration application, and of interacting with the user to provide the necessary input means.

Embodiments of the present invention do not require or rely on customization of the wireless access point, for example, to support new authentication and association protocols. That is, embodiments of the invention can be implemented with access points that are compliant with one or more of the IEEE 802.11 a/b/g standards, or with other similar wireless communication protocols. One or more network configuration parameters are encoded within the lengths of broadcast packets that are communicated from the computer to the wireless device via the wireless access point. In some embodiments, the network configuration parameter includes a pre-shared secret key required to join the wireless network. In various embodiments, other network configuration parameters including (but not limited to) the service set identifier (SSID), channel number, authentication and/or cipher type (e.g., WEP, WPA, WPA2), may also be passed to the wireless device. In some embodiments, the network configuration parameter or parameters are encoded in a series of broadcast packets by formatting each broadcast packet in the series to have a particular length. Accordingly, the length of each broadcast packet—which can be observed by any wireless device, including wireless devices not yet configured for the wireless network—is used to convey information. The payload portion of each broadcast packet is irrelevant, at least, for its conventional purpose of conveying information.

Depending upon the particular embodiment, one or more broadcast packets encode a portion (e.g., a character) of a network configuration parameter. In a particular embodiment of the invention, each broadcast packet in a pair of broadcast packets is formatted to have a particular length. The length of one broadcast packet in the pair of broadcast packets encodes a value (e.g., a character) included in the network configuration parameter. The length of the other broadcast packet in the pair of broadcast packets is an index indicating the position of the value within the network configuration parameter. By decoding multiple pairs of broadcast packets, and combining each portion of the network configuration parameter represented by each pair, the wireless device is able to decode the network configuration parameter, or parameters.

Figure 2A:
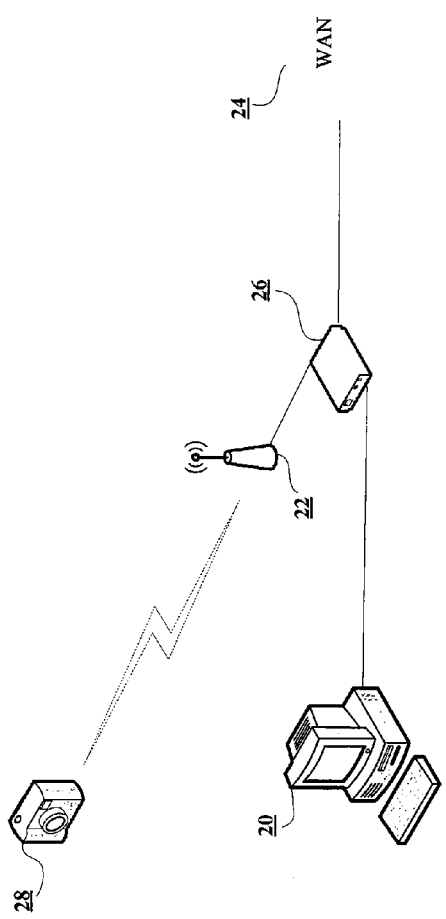
FIGS. 2A and 2B illustrate network environments, in which methods for configuring a wireless device may be implemented in accordance with embodiments of the present invention.

Referring now to FIG. 2A, an example network environment is shown. The network environment, which is typical of a home network or small office network, includes a computer 20 communicatively coupled to a wireless access point 22 and a wide area network (WAN) 24 by means of a multi-port routing device 26. Accordingly, the wireless access point 22 provides wireless local area network (WLAN) capabilities as an extension to a wired local area network (LAN). For example, the connection between the computer 20 and the multi-port routing device 26 is a wired connection (e.g., an Ethernet connection). The multi-port routing device 26 may be a switch or gateway, or any other device or set of devices that connects and routes network data between a LAN and a WAN 24, such as the Internet. Accordingly, the routing device 26 may include a dynamic host configuration protocol (DHCP) server that serves internet protocol (IP) addresses to devices connected to the LAN.

In the illustrations and examples provided herein, the wireless device 28 being configured is a camera device. However, it will be appreciated by those skilled in the art, that various methods consistent with embodiments of the invention may be implemented to configure a wide variety of wireless devices other than camera devices. In FIG. 2A, the wireless device 28 is a digital still camera (DSC) with wireless functionality. For example, the DSC may include a built-in wireless communications module with a wireless radio transceiver and the necessary software to communicate over a wireless network that is compliant with one or more of the IEEE 802.11 a/b/g standards. In one embodiment of the invention, the DSC's wireless capability is not built-in, but is provided by a removable media card that includes a wireless radio transceiver.

Before the wireless device 28 can join the LAN and receive an IP address, the wireless device 28 needs to be configured with network configuration parameters including, for example, a service set identifier (SSID), a channel number, and a pre-shared secret key. As described in greater detail below, in one embodiment of the invention, the network configuration parameter or parameters are communicated from the computer 20 to the wireless device 28 wirelessly via the wireless access point 22.

Figure 2B:
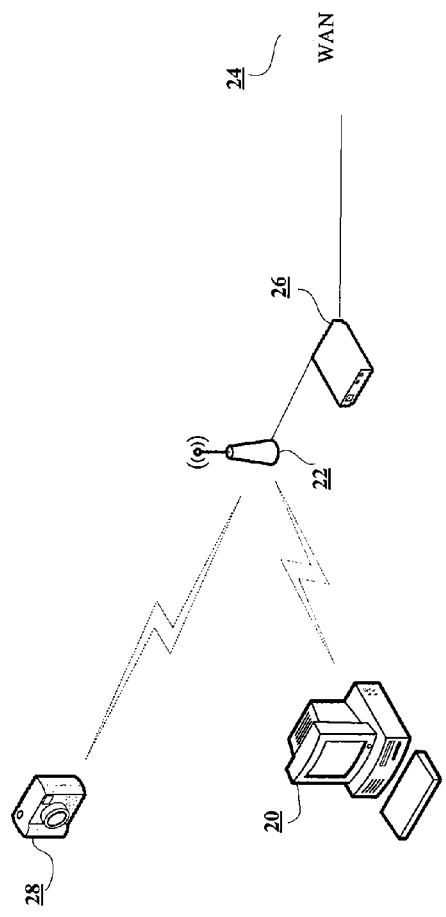

FIG. 2B illustrates another example network environment in which an embodiment of the invention may be implemented. The network environment depicted in FIG. 2B includes all of the same components as the network environment depicted in FIG. 2A. However, the LAN portion of the network environment is implemented exclusively as a wireless LAN, or WLAN. For instance, the computer 20 is configured to communicate directly and wirelessly with the wireless access point 22. Accordingly, the wireless access point 22 may include a DHCP server for serving IP addresses to nodes of the WLAN. In order to join the WLAN, and send and receive data over the WLAN, the wireless device 28 needs to be authenticated by the wireless access point 22, and properly associated with the wireless access point 22. Accordingly, the wireless device 28 must be configured with the proper network configuration parameters. As described in greater detail below, in an embodiment of the invention, the network configuration parameter or parameters are communicated from the computer 20 to the wireless device 28 wirelessly via the wireless access point 22.

Figure 3:
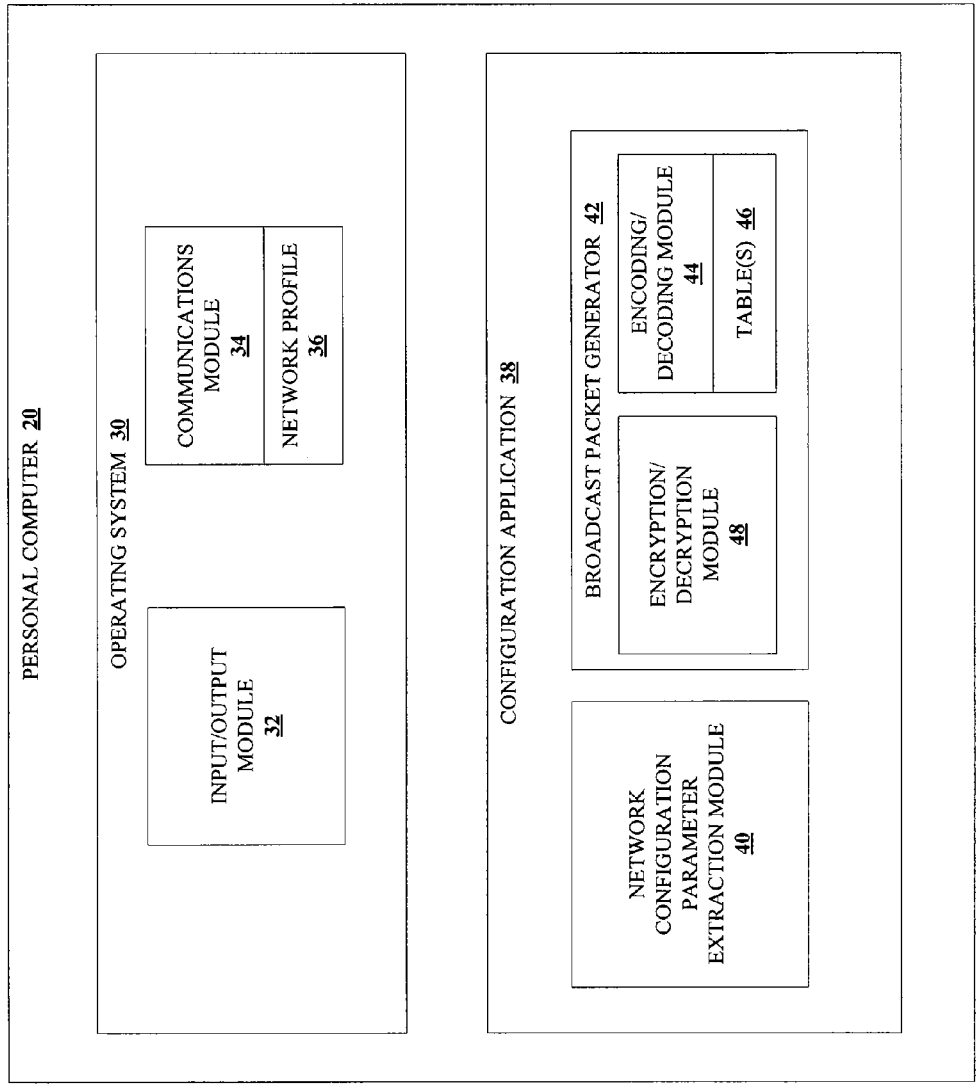
FIG. 3 illustrates a block diagram of a computer having a configuration application in accordance with embodiments of the invention.

FIG. 3 illustrates a block diagram of a computer 20 with a configuration application 38 for configuring a wireless device 28 in accordance with an embodiment of the invention. The computer 20 may be any conventional computing device to include a desktop computer, laptop computer, notebook computer, tablet computer, personal digital assistant or any similar device. As illustrated in FIG. 3, the computer 20 executes an operating system 30 (e.g., Microsoft Windows® or Linux®) that has an input/output module 32 and a communications module 34. The input/output module 32 facilitates the exchange of data with peripheral devices, such as outputting data to a monitor or display, and receiving input from a pointing device (e.g., mouse), a touchscreen display and/or keyboard. The communications module 34 facilitates the exchange of data with other nodes on the network. Accordingly, the communications module 34 generally may include the necessary software (e.g., device driver) for a wired, or wireless, network interface card, as well as the communication protocols for communicating data over the network interface card. In addition, the communications module 34 of the computer 20 may be associated with a network profile 36, which stores network configuration parameters utilized by the computer 20 to communicate over the network. In one embodiment of the invention, when the computer 20 wirelessly communicates with the wireless access point 22, the network profile 36 of the computer 20 may include the network configuration parameters (e.g., the pre-shared secret key) that are necessary to join the wireless network.

As illustrated in FIG. 3, the computer 20 includes an executable configuration application 38. The configuration application 38 includes a set of instructions that, when executed by the computer 20, perform the functions described herein. It will be appreciated by those skilled in the art that the configuration application 38 may be stored in memory or embodied on a disk (e.g, floppy disk, compact disc (CD), or digital video disc (DVD)) and introduced to the computer 20 by a user. For example, the configuration application 38 may be distributed with a media card that provides wireless communication functionality, as described in greater detail below.

The configuration application 38 includes a network configuration parameter extraction module 40. The extraction module 40, in one embodiment, automatically extracts network configuration parameters from a network profile 36 associated with the computer 20. Accordingly, if the computer 20 is connected wirelessly to a wireless access point (e.g., wireless access point 22 in FIG. 2B), then the computer's 20 network profile 36 will include the network configuration parameters required to add the wireless device 28 to the wireless network. Automatically extracting network configuration parameters from a network profile 36 of the computer 20 relieves unsophisticated users from having to possess any knowledge of network configuration parameters.

In an alternative embodiment, the configuration application 38 may prompt the user to enter one or more network configuration parameters. This may be required, for example, when the computer 20 is not wirelessly connected to the access point (as in FIG. 2A) and therefore, the network profile 36 of the computer 20 does not include the required network configuration parameters (e.g., the pre-shared secret key). Furthermore, by prompting the user to input the network configuration parameters, the user can configure the wireless device 28 with network configuration parameters for a network other than the network used to broadcast the network configuration parameters.

In any case, after the configuration application 38 has obtained the proper network configuration parameters, the broadcast packet generator 42 encodes the network configuration parameters in a series of broadcast packets. For example, the encoding/decoding module 44 of the broadcast packet generator 42 may format each broadcast packet in a series of broadcast packets to have a particular length. The length of each broadcast packet, which is observable to the wireless device 28 even before the wireless device 28 has joined the network, encodes information that indicates a portion of the network configuration parameter. For example, in one embodiment of the invention, various broadcast packet lengths correspond with values in one or more tables of values 46 that are common to the configuration application 38 executing on the computer 20 and a configuration application 76 executing on the wireless device 28 being configured.

In addition to encoding the one or more network configuration parameters, in one embodiment, the encryption/decryption module 48 of the configuration application 38 encrypts the one or more network configuration parameters prior to communicating the parameter or parameters to the wireless device 28. Various algorithms or methods known to those skilled in the art can be used to encrypt the network configuration parameters prior to encoding the parameters within the lengths of the broadcast packets. In one embodiment of the invention, an error correction code may also be used. By encoding the network configuration parameters with an error correction code before they are encrypted and/or encoded in the lengths of broadcast packets, the wireless device 28 is enabled to obtain the network configuration parameters even if one or more broadcast packets in the series of broadcast packets are not received, or are received incorrectly, by the wireless device 28.

Figure 4:
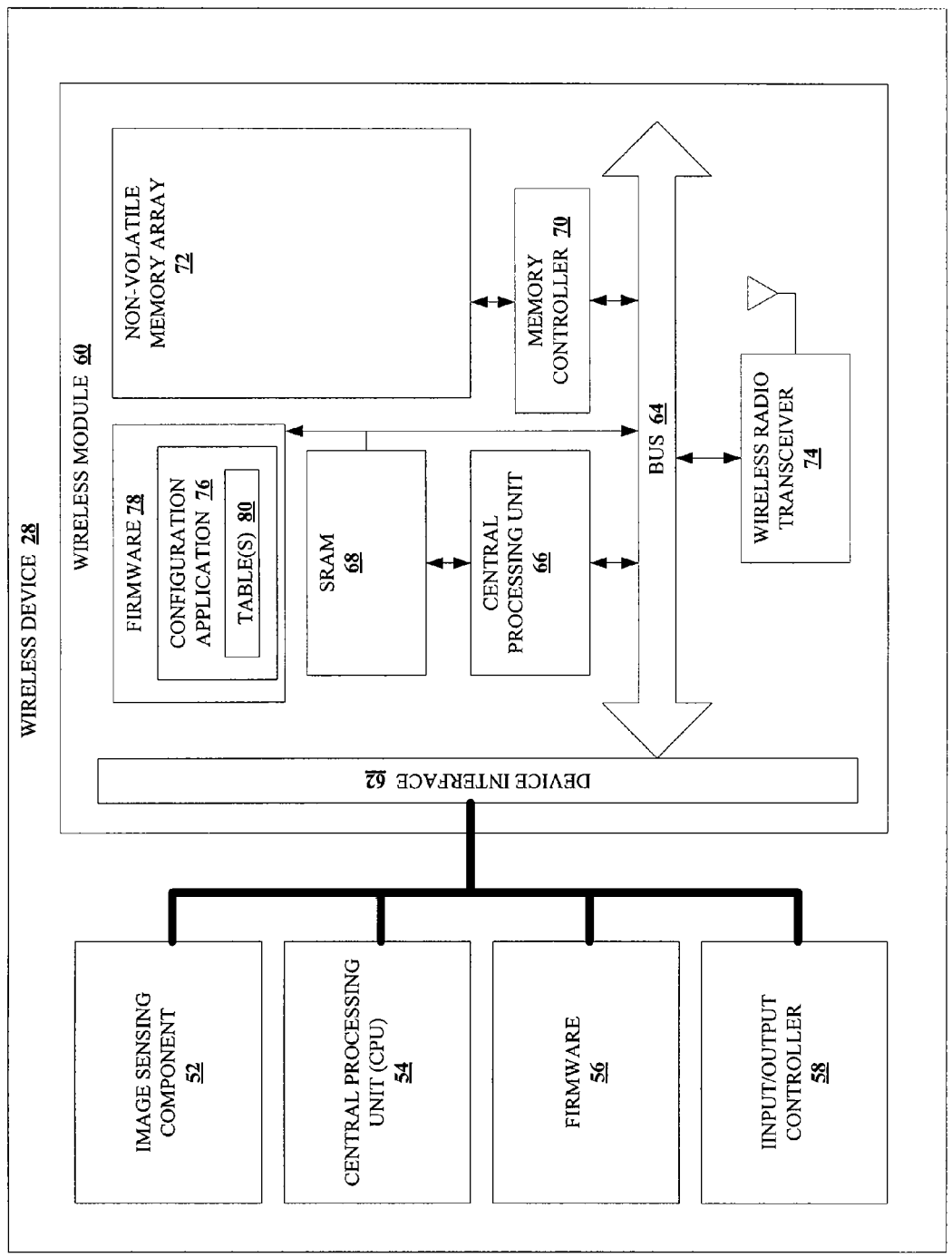
FIG. 4 illustrates a block diagram of a wireless device having a configuration application in accordance with embodiments of the invention.

FIG. 4 illustrates a block diagram of a wireless device 28, consistent with an embodiment of the invention. As illustrated in FIG. 4, the wireless device 28 includes an image sensing component 52 coupled to a central processing unit 54, firmware 56, and an input/output controller 58. Accordingly, when the wireless device 28 is powered on, the central processing unit 54 executes firmware instructions 56 thereby enabling the various functions of the wireless device 28. Accordingly, the input/output controller 58 facilitates the operation of the image sensing component for capturing, and in some embodiments displaying, images in a conventional manner.

In addition, the wireless device 28 includes a wireless module 60 that provides wireless communication functions, and in some cases, data storage. In one embodiment of the invention, the wireless module 60 may be built-in to the wireless device 28. Alternatively, the wireless module 60 may be part of a removable media card. For example, such a media card is described in greater detail in U.S. Provisional Patent Application No. 60/776,463. It will be appreciated by those skilled in the art that this type of media card may work with devices other than cameras.

Referring again to FIG. 4, the device interface 62 of the wireless module 60 is coupled to a bus 64 which is used for communicating electrical signals within the wireless module 60. In some cases, the bus 64 may be a dedicated bus between the device interface 62 and a central processing unit (CPU) 66 local to the wireless module 60. In other cases, the bus 64 may be a more general bus also used for communications between the CPU 66 and other components of the wireless module 60. In some embodiments, CPU 66 may be tightly coupled to CPU 54. In other embodiments, CPU 66 may not be a separate CPU, and may be the same as, or a portion of, CPU 54. When implemented as a media card, the device interface 62 and CPU 66 are consistent with conventional features that are typically part of such media cards. In some embodiments a read/write memory (such as an SRAM) 68 may be used. This provides a convenient storage area for the CPU 66 when performing computations and the like. SRAM 68 may be coupled to the bus 64 or may be coupled directly to the CPU 66 through a private communication interface.

A memory controller 70 and associated non-volatile memory array 72 may also be present. As illustrated in FIG. 4, a non-volatile memory array (e.g., a flash memory) 72 and memory controller 70 are shown. However, other storage media and associated controllers may be used. For example, a relatively new form of storage device incorporates a mini hard drive and associated controller within a physical format compatible with conventional media cards. Such storage devices may be used in connection with the present invention, which is storage format-agnostic. The memory controller 70 is coupled to the bus 64 and to the non-volatile memory array 72.

Also included in wireless module 60 is a wireless radio transceiver 74, which may be coupled to bus 64 so as to communicate with CPU 66. The wireless radio 74 preferably conforms to the IEEE 802.11 a/b/g specifications, but in other embodiments, other forms of wireless radios may be used. For example, wireless radios conforming to the Bluetooth specifications may be used. Alternatively, wireless radios conforming to the IEEE 802.16 standards may be used. The precise nature of the wireless communications supported by the wireless module 60 is not critical to the present invention.

In accordance with an embodiment of the invention, the wireless module 60 includes a configuration application 76 to automatically configure the wireless device 28 for use with a wireless network. As illustrated in FIG. 4, the configuration application 76 resides in a firmware 78 component of the wireless module 60. Alternatively, the configuration application 76 may reside in a portion of the non-volatile memory array 72, or in the firmware 56 of the wireless device 28. When executed by the central processing unit 66 of the wireless module 60, the configuration application 76 directs the radio transceiver 74 of the wireless communications module 60 to scan one or more channels for a network configuration parameter being broadcast. For example, in one embodiment of the invention, the radio transceiver 74 scans different channels attempting to identify a series of broadcast packets having lengths (measured in bytes) that are within a particular range, or group of ranges, such that the lengths of the broadcast packets generate a particular pattern (e.g., a broadcast packet length pattern). For example, in one embodiment, each broadcast packet in a pair of broadcast packets may have a length that is within a particular range. For instance, a first broadcast packet in the pair of broadcast packets may have a length ranging between 128 and 383 bytes, such that 256 different lengths are possible. The second broadcast packet in the pair of broadcast packets may have a length within the range of 768 to 1023 bytes, such that 256 different lengths are possible. Accordingly, each broadcast packet in the pair of broadcast packets has a length within a different range. By broadcasting several pairs of broadcast packets successively, a pattern is generated that under normal circumstances, is not likely to occur. The wireless device 28 seeks such a pattern to determine the channel on which a network configuration parameter is being broadcast.

It will be appreciated by those skilled in the art, that various methods consistent with embodiments of the invention may be implemented to generate recognizable patterns of packets to indicate a channel on which information is being broadcast. In some embodiments, the pattern of broadcast packets (e.g., the pattern of packet lengths) encoding the network configuration parameter will be easily recognizable as such a pattern would not likely occur in the normal course of operation. In other embodiments, a separate easily recognized pattern of packets is sent periodically in order to identify the channel on which the encoded network configuration parameter is broadcast. In some implementations, the separate easily recognized pattern of packets is used as a marker to identify that subsequent packets encode the network configuration parameter. In some usage scenarios, a handshake protocol is used wherein the computer 20 first broadcasts a recognizable pattern of packets on a given channel until the wireless device 28 determines the channel (by recognizing the pattern) and then broadcasts an acknowledgement by replaying one or more of the received packets. When the computer 20 receives the acknowledgment, the computer 20 is then enabled to send a series of broadcast packets that encode the network configuration parameter on the channel.

Each broadcast packet may include the SSID within a field (e.g., within the header portion) of the broadcast packet. Accordingly, the wireless device 28 may be able to ascertain the SSID of the network that is broadcasting the network configuration parameter by simply identifying a channel on which the particular broadcast packet length pattern is observed. Therefore, in one embodiment of the invention, only the pre-shared secret key needs to be included in the encoded network configuration parameter. However, in some cases, the SSID is not included in the header portion of the broadcast packet. Furthermore, in some cases, a user may be configuring the wireless device 28 to work with a WLAN other than the WLAN used to broadcast the network configuration parameter or parameters. Therefore, in some embodiments, the SSID and/or channel number are encoded in the lengths of the broadcast packets.

In any case, after identifying such a pattern of broadcast packets, the radio transceiver 74 is directed (e.g., by instruction from CPU 66) to tune to the channel on which those broadcast packets were identified. Next, the configuration application 76 attempts to decode one or more network configuration parameters by analyzing the lengths of broadcast packets in a series of broadcast packets. The configuration application 76 may include one or more tables 80 storing values that correspond with different broadcast packet lengths. In one embodiment, the tables 80 are used, as described in greater detail below, to decode a network configuration parameter that has been encoded in the lengths of a series of broadcast packets. The term table, as used herein, is not meant to limit the invention to any one particular type of data structure. For example, other means of mapping broadcast packet lengths to values and indices may be used, to include: linked arrays, matrices, simple calculations, and the like.

Figure 5:
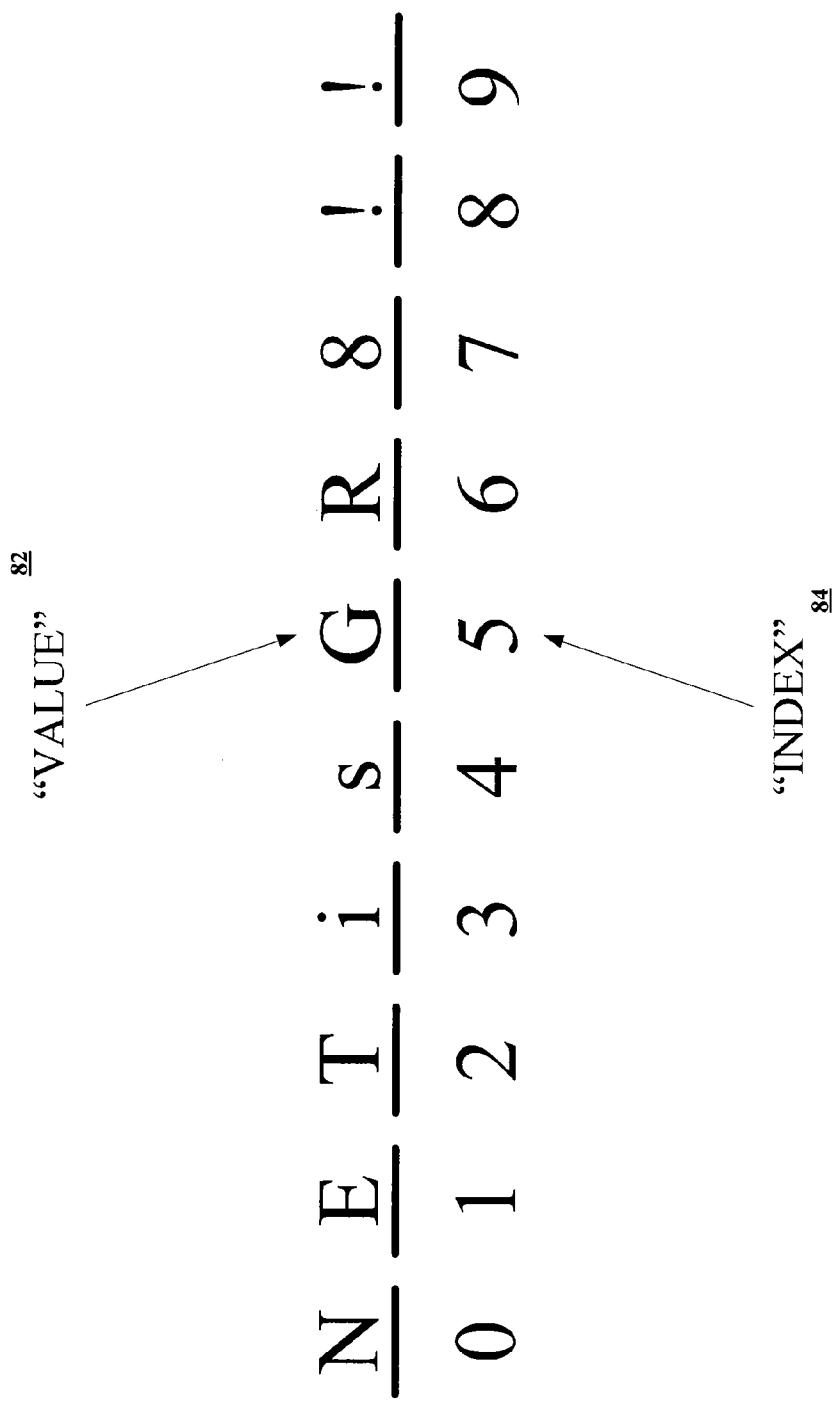
FIG. 5 illustrates an example of a network configuration parameter in accordance with an embodiment of the invention.

FIG. 5 illustrates an example of a network configuration parameter. In particular, the network configuration parameter "NETisGR8!!" is a pre-shared secret key. For example, the pre-shared secret key may be a WEP key required by a wireless device in order to authenticate and associate with a wireless access point. As shown in FIG. 5, the pre-shared secret key consists of a character stream with ten characters or values 82, and each value has a position within the character stream identified by an index number 84. For example, the character or value "G" occupies the sixth position in the network configuration parameter and is therefore associated with the index number "5". As described in greater detail below, in one embodiment of the invention one or more broadcast packets are used to encode each value and associated index indicating the position of the value within the pre-shared secret key, such that the one or more broadcast packets encode a portion of the network configuration parameter.

While FIG. 5 and other examples use characters for convenience of illustration, it will be appreciated by those skilled in the art that any method of breaking the message in to discrete pieces of a known size is within the spirit of this invention. It is not even required that all the pieces be a same size, or that the range of any size piece be a power-of-two. For example, in some embodiments, each portion of the network configuration parameter could be communicated as a triple comprising a position, a value, and a range or size for that value. The range or size could be a number of bits, or it could be an arbitrary range.

Figure 6:
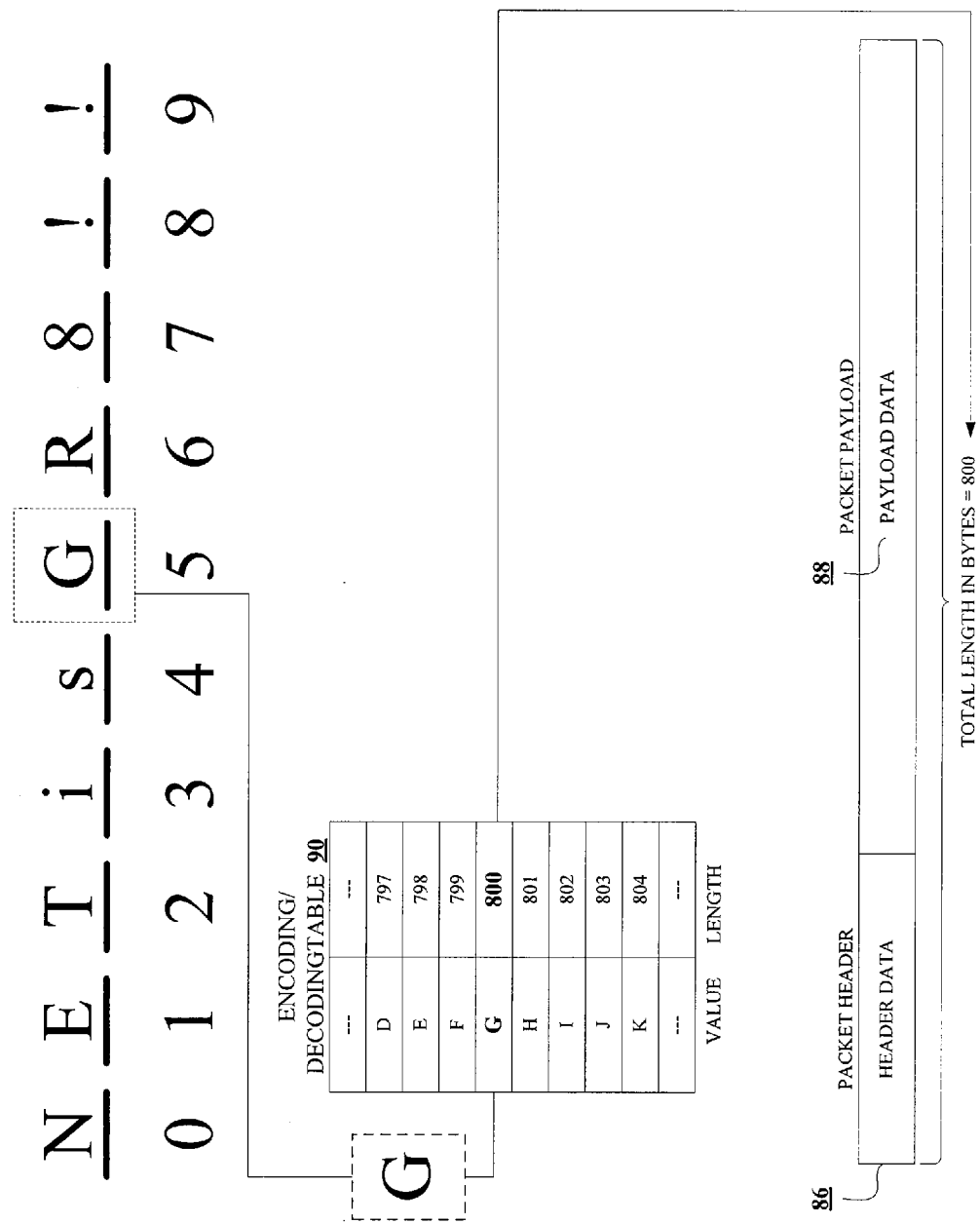
FIG. 6 depicts an example of a broadcast packet encoding, within the length of the broadcast packet, a portion of a network configuration parameter in accordance with an embodiment of the invention.

FIG. 6 illustrates an example of a broadcast packet 86 encoding a portion of a network configuration parameter in accordance with an embodiment of the invention. As illustrated in FIG. 6, "NETisGR8!!" represents a pre-shared secret key, which is required by a wireless device in order to authenticate and/or associate with a wireless network. Accordingly, the configuration application 38 executing on the computer 20 encodes the pre-shared secret key within a series of broadcast packets, each broadcast packet in the series having a length that corresponds with a value (e.g., a character) in the pre-shared secret key. For example, to encode the sixth letter of the pre-shared secret key—that is, the letter "G"—the configuration application 38 generates a broadcast packet 86 having a length, in bytes, of 800. Because the payload portion 88 of the packet is not used to convey information, the content of the payload portion 88 of the broadcast packet 86 is irrelevant, so long as the length of the broadcast packet 86 in bytes is equal to 800.

As illustrated in FIG. 6, the encoding/decoding table 90 maps each value in a set of values (e.g., characters) to a corresponding broadcast packet length. Accordingly, the table 90 shows that the letter "G" is associated with a broadcast packet having a length of 800 bytes. In one embodiment of the invention, a copy of the table 90 resides on the computer 20 and is utilized by the configuration application 38 to encode one or more network configuration parameters. In addition, a version of the table 90 resides on the wireless device 28 and is used by the configuration application 76 executing on the wireless device 28 to decode the one or more network configuration parameters.

Figure 7:
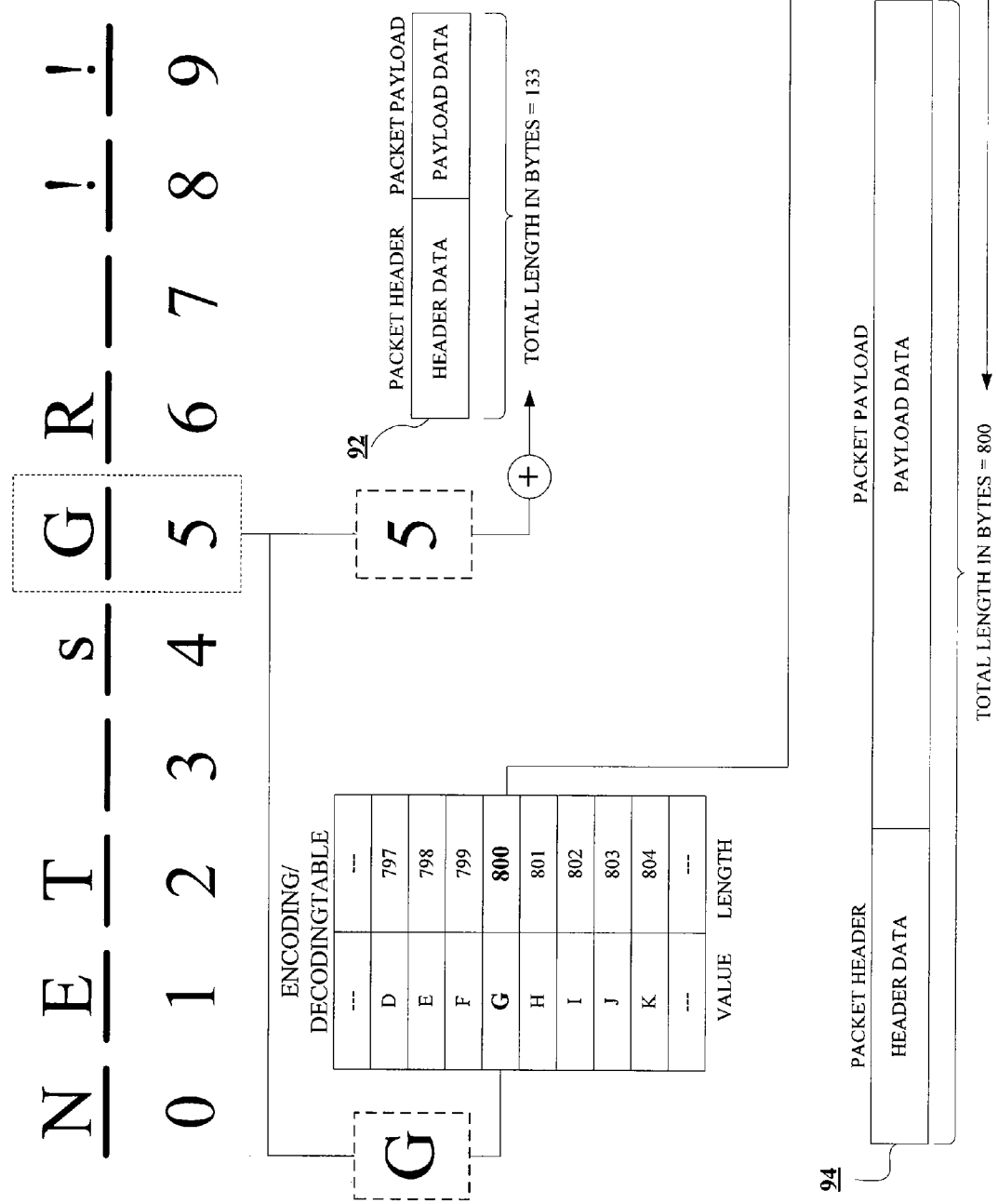
FIG. 7 depicts an example of a pair of broadcast packets encoding, within the lengths of the respective broadcast packets, a portion of a network configuration parameter and an index indicating its position within the network configuration parameter in accordance with an embodiment of the invention.

In some embodiments, as will be seen with respect to FIG. 7, a first table is used to encode network configuration parameter indices into a first range of lengths, and a second table is used to encode network configuration parameter values into a second range of lengths. In some implementations, the first range of lengths and the second range of lengths are non-overlapping. In some usage scenarios, the first and/or second ranges of lengths are chosen such that packets of those lengths, or with those combinations of lengths, are typically less frequently occurring on networks.

When a wireless device 28 receives the broadcast packet 86, the configuration application 76 executing on the wireless device 28 decodes the broadcast packet 86 by analyzing the broadcast packet 86 to determine its length, and then utilizes the length to look up a corresponding value (e.g., a character) in a table residing on the wireless device 28. By combining multiple decoded characters, the configuration application 76 executing on the wireless device 28 is able to decode the entire network configuration parameter or parameters.

One potential issue with the method of encoding the network configuration parameter described above is that the success of the method depends upon the wireless device receiving every broadcast packet in the series of broadcast packets in order. This may not always be the case. For example, during the operation to broadcast the series of broadcast packets from the computer 20 to the wireless device 28, the wireless device 28 may receive one or more broadcast packets from a source other than the configuration application 38 executing on the computer 20. If a broadcast packet received at the wireless device 28 from a source other than the configuration application 38 is handled as if it was received from the configuration application 38, then the network configuration parameter may not be decoded properly at the wireless device 28. Furthermore, for a variety of reasons, one or more of the broadcast packets in the series of broadcast packets encoding the network configuration parameter may not be received by the wireless device 28, or may be received out of order. Another embodiment of the invention implements an encoding scheme that properly addresses the above issues. A variety of such encoding schemes exist, and one such encoding scheme is described below in connection with FIG. 7.

Referring now to FIG. 7, in one embodiment, the network configuration parameter is essentially a byte stream, wherein each byte represents a portion of the network configuration parameter. Each value represented by a byte in the stream has an index, such as the index "0" for the first byte, the index "1" for the second byte, and so on. In one embodiment, the byte stream representing the network configuration parameter is transmitted reliably by encoding each character as a pair of broadcast packets. One broadcast packet in each pair (e.g., broadcast packet 92), provides, as encoded in the packet length, a value of a particular byte in the byte stream. For example, as illustrated in FIG. 7, the first broadcast packet 92 has a packet length of "800" corresponding to the value "G". The other broadcast packet in each pair (e.g., broadcast packet 94), provides, as encoded in the broadcast packet length, the index of the value encoded in the first broadcast packet. For example, the index, encoded in the length of the second broadcast packet 94 in the pair, indicates the position, within the network configuration parameter, of the value encoded in the first broadcast packet. In FIG. 7, the index 5 is encoded as a broadcast packet of length 133 bytes, indicating that the character "G" is the sixth character in the network configuration parameter.

In one embodiment, each broadcast packet length is calculated relative to a base packet length, such that the value and index are determined by subtracting the actual broadcast packet length from the base packet length. For example, a value of 17 in position 23 in the byte stream could be encoded by sending a first packet of length x+23, and a second packet of length y+17, where the values 'x' and 'y' are base packet lengths known to both configuration application 38 executing on the computer 20 and configuration application 76 executing on the wireless device 28.

By encoding a network configuration parameter in this manner, it is not necessary that the wireless device 28 receive all broadcast packets in order. Moreover, the above described encoding mechanism does not require that all packets be received in any one transmission of the byte stream. For example, the byte stream may be broadcast continuously for a predetermined period of time, or a predetermined number of transmissions. By continuously transmitting the encoded byte stream, techniques such as majority voting can be utilized to provide robustness. For example, because the index of each received value is provided, each received value at an index can be compared with, and voted with, previously received values at that index.

In some cases, the base packet length may not be known in advance by configuration application 76. For example, it may not be necessary that the values 'x' and 'y' be known in advance at the wireless device. This may be advantageous in scenarios where the amount of overhead provided by the network is not known. Configuration application 76 executing on the wireless device 28 may determine the values of 'x' and of 'y' if configuration application 38 sends packet pairs such as x−1/y−1 and/or x+256/y+256. In other words, the smallest and/or largest lengths received are understood to not be part of the byte stream encoding, but instead are used as markers delineating the valid range of values expected in the byte stream encoding.

In some embodiments, different network configuration parameters, or other information of interest, may be communicated from configuration application 38 to configuration application 76 by using different ranges of indices. For example, a first range of packet lengths from x to x+255 is used to encode information indices for a first piece of information, and a second, non-overlapping range of packet lengths from z to z+255 is used to encode information indices for a second piece of information. Pairs of packets using this index encoding for a first packet, and a value encoding as above for a second packet, can be used to communicate two separate pieces of information.

Referring now to FIG. 8, in one embodiment, a character stream is transmitted reliably by encoding a value (e.g., a character) and its associated index indicating the position of the value within the network configuration parameter, as a single broadcast packet of a particular length. Accordingly, the broadcast packet length is a function of the index and the value being encoded. For example, using six-bit characters, a stream of up to 128 characters in length may be encoded using broadcast packet lengths ranging from 128 to 8319 bytes. The 8192 different lengths encode 8192 distinct values, and each broadcast packet length corresponds to a particular choice of stream index and the value at that index. Of course, for a given message, only 128 of the 8192 possibly values are used—one value for each index in the stream. As illustrated in FIG. 8, a portion of the encoding/decoding table 96 shows that the character "G" occurring in the first position (e.g., with index 0) of a network configuration parameter can be encoded as a broadcast packet with length "32." The character "G" occurring in the sixth position (e.g., with index 5) of the network configuration parameter is encoded as a broadcast packet with a length of 828 bytes.

Those skilled in the art will appreciate that in any particular implementation, the range of values that can be encoded in the length of a broadcast packet may be limited by the maximum length broadcast packet that is allowed to be broadcast. Therefore, in some embodiments, each character—value and index—are encoded as group of packets. Accordingly, the length of each broadcast packet in the group of broadcast packets is a function of the particular value and its associated index. For example, a first packet may have lengths ranging from x+0 to x+63, a second packet may have lengths ranging from y+0 to y+127, and a third packet may have lengths ranging from z+0 to z+31. The receipt of such a packet triple thus provides an 18-bit number (six bits from the length range of the first packet, 7 bits from the length range of the second packet, and 5 bits from the length range of the third packet) which can be used to encode both a value and an associated index indicating the position of the value within the network configuration parameter. In some embodiments, a sequence of packets is thus used to encode an n-bit number. In turn, the n-bit number is used to encode a portion of a network configuration parameter, or other information.

It will be appreciated by those skilled in the art that there may also be uncertainties in the amount of network overhead added to each packet, such that it may be difficult, or even impossible, to determine the exact length of a broadcast packet to be sent from the configuration application 38 of the computer 20 and received by the configuration application 76 of the wireless device 28. In some embodiments, the least significant bits of the broadcast packet length are not used due to these uncertainties. For example, the configuration application 38 of the computer 20 may send packets with lengths in the range of 16*(x+0) to 16*(x+31), instead of lengths in the range of x+0 to x+31, thereby allowing for up to 16 bytes of uncertainty in the overhead added to each packet. Configuration application 76 executing on the wireless device 28, upon receiving such a broadcast packet, can decode one of the 32 possible values from the broadcast packet length despite 0 to 15 bytes of variability in the packet length added by the network. A sequence of packets encoded in such a manner can encode an n-bit number, and the n-bit number can encode a portion of a network configuration parameter or other information.

In one embodiment of the invention, one or more broadcast packets may encode characters that are not literally included in the network configuration parameters, but instead have a special meaning. A special character, for example, may signal the beginning or end of a network configuration parameter when two or more network configuration parameters are broadcast together as a single character stream. For example, if a special character representing a termination point occurs at index number 56, then the configuration application 76 can determine that the character associated with index number 55 is the last character of one network configuration parameter, and the character associated with index number 57 is the first character of the second network configuration parameter. Other special characters may indicate the type of a network configuration parameter, or a number of network configuration parameters included in the series of broadcast packets, or a start or an end of the entire series of network configuration parameters.

In one embodiment of the invention, the network configuration parameter may be encrypted at the computer 20 prior to being broadcast to the wireless device 28, where it is decrypted. The network configuration parameter may be encrypted before or after it is encoded by an error-correction code. A variety of encryption methods may be utilized to include symmetric key encryption, or asymmetric key encryption. In one embodiment of the invention, each wireless device 28 may have a unique serial number, known only to the wireless device 28 and the configuration application 38 of the computer 20. For example, the configuration application 38 of the computer 20 may prompt the user to input the unique serial number to be used as an encryption key in an encryption algorithm. Accordingly, the configuration application 38 may encrypt the network configuration parameter (e.g., each portion, or character, of the network configuration parameter) at the computer 20 utilizing the encryption key. When the wireless device 28 receives the encrypted portion of the network configuration parameter, the wireless device 28 utilizes the encryption key to decrypt the portion of the network configuration parameter. The encryption operation provides an added level of protection.

After the wireless device 28 has decrypted and decoded the network configuration parameter or parameters, the wireless device 28 is able to configure itself and request access to the network in a conventional manner, for example, by sending the wireless access point 22 an authentication request. In response to receiving the authentication request, the wireless access point 22 communicates a challenge (e.g., challenge text) to the wireless device 28. The wireless device 28, now in possession of the pre-shared secret key, can properly respond to the challenge, for example, by encrypting the challenge utilizing the pre-shared secret key.

In one embodiment of the invention, if the wireless device 28 fails in the authentication operation, the wireless device 28 may make an attempt to communicate with the configuration application 38 executing on the computer 20 by means of one or more back channels in order to provide a status message, or in some cases, to request an alternative channel for communicating the network configuration parameters. For example, if the network configuration parameter received by the wireless device 28 included an incorrect pre-shared secret key, or if an error in transmission results in the wireless device 28 receiving an incorrect pre-shared secret key or in not being able to receive the pre-shared secret key at all, the wireless device 28 may attempt to communicate a status message to the configuration application 38 on the computer 20.

In one embodiment of the invention, the wireless device 28 may simply "replay" one or more of the broadcast packets it received, by broadcasting each broadcast packet back on to the network. For example, if the wireless network uses WEP, when the wireless device 28 receives broadcast packets, which have been encrypted with the WEP pre-shared secret key, the wireless device can retransmit the broadcast packets on the network. Accordingly, the configuration application 38 on the computer 20 can determine that the wireless device 28 received the broadcast packets, but was unable to configure itself and authenticate itself, if the computer 20 receives the "replayed" broadcast packets from the wireless device 28. In some embodiments, the wireless device uses multiple of the broadcast packets it has received to communicate a status message back to the computer 20.

Another method for communicating a status message to the computer 20 involves embedding information in one or more fields of an 802.11 BEACON or PROBE message. For example, the configuration application 76 executing on the wireless device 28 may embed a status message within a field of a BEACON or PROBE packet, which will be observable to any wireless stations in the vicinity of the wireless device 28. Upon observing such a message, the configuration application 38 of the computer 20 can determine the meaning of any embedded information within particular fields of the packet.

In another embodiment of the invention, the configuration application 76 of the wireless device 28 may attempt to communicate with the computer 20 on an open network (e.g., a network not secured with a pre-shared secret key) if one is available. For example, if the wireless device 28 receives the network configuration parameter, but is still unable to join the network from which the network configuration parameter was received, the wireless device 28 may search for an open network. If the wireless device 28 finds an open network and is able to join the open network, the wireless device 28 may communicate a status message to the computer 20, possibly through a centralized server. The configuration application 38 may, for example, check with the centralized server to determine the status of the wireless device 28 if the computer 20 does not receive a positive response from the wireless device 28. Moreover, in one embodiment, the configuration application 38 executing on the computer 20 may attempt to communicate the network configuration parameters to the wireless device 28 via the open network.

In yet another embodiment, the wireless device 28 may have a means of displaying a status message. For example, in one embodiment of the invention, the wireless device 28 may be able to communicate a message on a liquid crystal display (LCD). Alternatively, a simple light such as a light emitting diode (LED) may be utilized as a rudimentary means of communicating an output message to the user, indicating whether the configuration operation has completed successfully or not.

Although the present invention will prove particularly useful when implemented in or with mobile wireless devices with limited input means, such as cameras, mobile phones, and some personal digital assistants (PDA), it will be appreciated by those skilled in the art that the invention is not limited to such devices. In various embodiments of the invention, the wireless device to be configured may be a desktop computer, laptop computer, notebook computer, or similar wireless device.

Thus, a method and system for configuring a wireless device by communicating a network configuration parameter from a computer to the wireless device has been described.

We claim:

1. A method, comprising: broadcasting, from a host computer communicatively coupled to an access point of a wireless network, a series of broadcast packets encoding at least one network configuration parameter as varying lengths of said broadcast packets, the series of broadcast packets comprising a byte stream in which each byte represents a portion of the network configuration parameter, each value represented in the byte stream has an index, and each broadcast packet is formatted relative to a respective base packet length such that each respective value or index is determined by comparing a respective broadcast packet's actual length to a length of the respective base packet, so as to enable a wireless device configured to decode the at least one network configuration parameter to join the wireless network upon receiving the series of broadcast packets.

2. The method of claim 1, wherein a particular index number indicates a position of a particular value within the at least one network configuration parameter.

3. The method of claim 1, wherein a particular length of a first broadcast packet in a pair of broadcast packets corresponds with a particular value, and a particular length of a second broadcast packet in the pair of broadcast packets indicates a position of the particular value within the at least one network configuration parameter.

4. The method of claim 1, wherein particular lengths of those of the broadcast packets in a group of broadcast packets correspond with a particular value and a particular index number, said particular index number indicating a position of the particular value within the at least one network configuration parameter.

5. The method of claim 4, wherein the group of broadcast packets includes three or more broadcast packets.

6. The method of claim 4, wherein the broadcast packets in the group of broadcast packets are to be broadcast in succession.

7. The method of claim 1, wherein a configuration application executing on the host computer prompts a user to input the at least one network configuration parameter to be encoded in the series of broadcast packets.

8. The method of claim 1, wherein a configuration application executing on the host computer automatically extracts, from a network profile associated with the host computer, the at least one network configuration parameter to be encoded in the series of broadcast packets.

9. The method of claim 1, wherein the at least one network configuration parameter is a pre-shared secret key, shared between the access point and the wireless device, said pre-shared secret key utilized by the wireless device to authenticate and/or associate with the access point of the wireless network.

10. The method of claim 9, wherein the pre-shared secret key is utilized by the wireless device to encrypt data sent to, and decrypt data received from, the access point of the wireless network.

11. The method of claim 1, further comprising encrypting the at least one network configuration parameter at the host computer with a shared encryption key, shared between the host computer and the wireless device, prior to encoding the at least one network configuration parameter in the lengths of said broadcast packets.

12. The method of claim 11, wherein the shared encryption key is derived from a serial number associated with the wireless device.

13. The method of claim 1, further comprising repeatedly broadcasting, a predetermined number of times, the series of broadcast packets encoding the at least one network configuration parameter in the lengths of said broadcast packets, so as to enable the wireless device to receive the entire series of broadcast packets if a particular broadcast packet in a particular series of the broadcast packets is not received by the wireless device or is corrupt when received by the wireless device.

14. The method of claim 1, further comprising encoding the at least one network configuration parameter with an error-correction code prior to encoding the at least one network configuration parameter in the lengths of said broadcast packets, so as to enable the wireless device to derive the at least one network configuration parameter from decoded broadcast packets, when less than every broadcast packet in the series of broadcast packets is received correctly at the wireless device.

15. A system, comprising: a computing device communicatively coupled to a wireless access point of a wireless network, the computing device configured to execute a configuration application to encode a network configuration parameter as varying lengths of a series of broadcast packets, the series of broadcast packets comprising a byte steam in which each byte represents a portion of the network configuration parameter, each value represented in the byte stream has an index, and each broadcast packet is formatted relative to a respective base packet length such that each respective value or index is determined by comparing a respective broadcast packet's actual length to a length of the respective base packet, and to communicate the series of broadcast packets to the wireless access point to be broadcast to one or more wireless devices so as to enable a wireless device configured to decode the at least one network configuration parameter to join the wireless network upon receiving the series of broadcast packets.

16. The system of claim 15, wherein the configuration application includes an encoding module to format each broadcast packet within the series of broadcast packets to have a particular length, said particular length corresponding with a particular value related to a portion of the network configuration parameter.

17. The system of claim 15, wherein the configuration application includes an encoding module to format each broadcast packet within the series of broadcast packets to have a particular length, said particular length corresponding with a particular value and a particular index number, wherein the particular index number indicates the position of the particular value within the at least one network configuration parameter.

18. The system of claim 15, wherein the configuration application includes an encoding module to format each broadcast packet in a pair of broadcast packets within the series of broadcast to have a particular length, wherein the particular length of a first broadcast packet in the pair of broadcast packets corresponds with a particular value, and the particular length of a second broadcast packet in the pair of broadcast packets indicates a position of the particular value within the at least one network configuration parameter.

19. The system of claim 15, wherein the configuration application includes an encoding module to format each broadcast packet in a group of broadcast packets within the series of broadcast packets to have a particular length, wherein the particular lengths of the broadcast packets in the group of broadcast packets correspond with a particular value and a particular index number, said particular index number indicating a position of the particular value within the at least one network configuration parameter.

20. The system of claim 19, wherein the group of broadcast packets includes three or more broadcast packets.

21. The system of claim 15, wherein the configuration application is configured to prompt a user to input the network configuration parameter to be encoded in the lengths of the series of broadcast packets.

22. The system of claim 15, wherein the configuration application is configured to automatically extract, from a network profile associated with the computing device, the network configuration parameter to be encoded in the lengths of the series of broadcast packets.

23. The system of claim 15, wherein the network configuration parameter is a pre-shared secret key, shared between the wireless access point and one or more wireless devices, said pre-shared secret key utilized by the wireless device to authenticate and/or associate with the wireless access point of the wireless network.

24. The system of claim 15, wherein the pre-shared secret key is utilized by the wireless device to encrypt data sent to, and decrypt data received from, the access point of the wireless network.

25. The system of claim 15, wherein the configuration application includes an encryption module to encrypt the network configuration parameter with a shared encryption key, shared between the computing device and the wireless device, prior to encoding the network configuration parameter in the lengths of the series of broadcast packets.

26. The system of claim 25, wherein the shared encryption key is derived from a serial number associated with the wireless device.

27. The system of claim 15, wherein the configuration application is configured to repeatedly broadcast the series of broadcast packets, so as to enable the wireless device to receive the entire series of broadcast packets if a particular broadcast packet in a particular series of the broadcast packets is not received by the wireless device or is corrupt when received by the wireless device.

28. The system of claim 15, wherein the configuration application is configured to encode the network configuration parameter with an error-correction code prior to encoding the network configuration parameter in the lengths of the series of broadcast packets, so as to enable the wireless device to derive the at least one network configuration parameter from decoded broadcast packets, when less than every broadcast packet in the series of broadcast packets is received correctly at the wireless device.

29. A method, comprising:
receiving, at a wireless device, a series of broadcast packets from a wireless access point, the series of broadcast packets encoding at least one network configuration parameter required to join a wireless network, the at least one network configuration parameter being encoded as varying lengths of the broadcast packets, each broadcast packet formatted relative to a respective base packet length such that each respective value or index represented by a respective broadcast packet's length is determined by comparing the respective broadcast packet's length to a length of a respective base packet;
decoding the at least one network configuration parameter; and
utilizing the at least one network configuration parameter to join the wireless network.

30. The method of claim 29, wherein the at least one network configuration parameter is encoded in the series of broadcast packets by formatting a broadcast packet within the series of broadcast packets to have a particular length, said particular length corresponding with a particular value representing a portion of the at least one network configuration parameter.

31. The method of claim 29, wherein the at least one network configuration parameter is encoded in the series of broadcast packets by formatting a broadcast packet within the series of broadcast packets to have a particular length, said particular length corresponding with a particular value representing a portion of the network configuration parameter and a particular index number, wherein the particular index number indicates the position of the particular value within the at least one network configuration parameter.

32. The method of claim 29, wherein the at least one network configuration parameter is encoded in the series of broadcast packets by formatting each broadcast packet in a pair of broadcast packets within the series of broadcast to have a particular length, wherein the particular length of a first broadcast packet in the pair of broadcast packets corresponds with a particular value representing a portion of the network configuration parameter, and the particular length of a second broadcast packet in the pair of broadcast packets indicates a position of the particular value within the at least one network configuration parameter.

33. The method of claim 29, wherein the at least one network configuration parameter is encoded in the series of broadcast packets by formatting each broadcast packet in a group of broadcast packets within the series of broadcast packets to have a particular length, wherein the particular lengths of the broadcast packets in the group of broadcast packets correspond with a particular value representing a portion of the network configuration parameter and a particular index number, said particular index number indicating a position of the particular value within the at least one network configuration parameter.

34. The method of claim 29, wherein the at least one network configuration parameter is encoded in the series of broadcast packets by formatting each broadcast packet in a group of broadcast packets within the series of broadcast packets to have a particular length, and the particular lengths of the broadcast packets in the group of broadcast packets correspond with a particular number, said particular number encoding information related to the value of the network configuration parameter.

35. The method of claim 29, further comprising:
prior to decoding the at least one network configuration parameter, scanning radio channels to identify a particular radio channel on which a series of broadcast packets are being broadcast, wherein the lengths of the broadcast packets in the series of broadcast packets exhibit a predetermined pattern.

36. The method of claim 35, wherein the series of broadcast packets encode a network configuration parameter.

37. The method of claim 35, further comprising:
subsequent to identifying the particular radio channel, broadcasting an acknowledgment by replaying at least one broadcast packet of the series of broadcast packets.

38. The method of claim 29, further comprising:
prior to decoding the at least one network configuration parameter, scanning radio channels to identify a particular radio channel on which a series of broadcast packets are being broadcast, the series of broadcast packets including pairs of broadcast packets, each pair of broadcast packets having a first broadcast packet with a length that is within a first range, and a second broadcast packet with a length that is within a second range.

39. The method of claim 29, further comprising utilizing the at least one network configuration parameter to authenticate and/or associate with the access point of the wireless network.

40. The method of claim 29, wherein the at least one network configuration parameter is a pre-shared secret key, shared between the wireless access point and the wireless device.

41. The method of claim 29, further comprising utilizing the pre-shared secret key to encrypt data sent to, and decrypt data received from, the wireless access point.

42. The method of claim 29, further comprising decrypting the at least one network configuration parameter with a shared encryption key, shared between the wireless device and a computing device, after decoding the at least one network configuration parameter.

43. A wireless device, comprising:
a wireless radio transceiver;
a wireless communications module to receive, via the wireless radio transceiver, a series of broadcast packets encoding a network configuration parameter as varying lengths of said broadcast packets, each broadcast packet formatted relative to a respective base packet length such that each respective value or index represented by a respective broadcast packet's length is determined by comparing the respective broadcast packet's length to a length of a respective base packet;
a decoding module to decode the network configuration parameter encoded within the lengths of the broadcast packets; and
a configuration application to utilize the network configuration parameter in an operation to join a wireless network.

44. The wireless device of claim 43, wherein the decoding module includes a table having a plurality of values, and the decoding module is to associate the length of a broadcast packet with a particular value from the table, the particular value representing a portion of the network configuration parameter.

45. The wireless device of claim 43, wherein the decoding module includes a table having a plurality of values and a plurality of index numbers, and the decoding module is to associate the length of a broadcast packet with a particular value and a particular index number from the table, the particular value representing a portion of the network configuration parameter and the particular index number indicating a position of the particular value within the network configuration parameter.

46. The wireless device of claim 43, wherein the decoding module includes a table having a plurality of values and a plurality of index numbers, and the decoding module is to associate the lengths of two broadcast packets in a pair of broadcast packets with a particular value and a particular index number from the table, the particular value representing a portion of the network configuration parameter and the particular index number indicating a position of the particular value within the network configuration parameter.

47. The wireless device of claim 43, wherein the decoding module includes a table having a plurality of values and a plurality of index numbers, and the decoding module is to associate the lengths of three or more broadcast packets in a group of broadcast packets with a particular value and a particular index number from the table, the particular value representing a portion of the network configuration parameter and the particular index number indicating a position of the particular value within the network configuration parameter.

48. The wireless device of claim 43, wherein the decoding module includes a means for mapping the length of a broadcast packet to a value representing a portion of the network configuration parameter.

49. The wireless device of claim 43, wherein the decoding module includes a means for mapping the length of a broadcast packet to a value and an index number, the value representing a portion of the network configuration parameter and the index number indicating a position of the value within the network configuration parameter.

50. The wireless device of claim 43, wherein the decoding module includes a means for mapping the lengths of two broadcast packets in a pair of broadcast packets to a value and an index number, the value representing a portion of the network configuration parameter and the index number indicating a position of the value within the network configuration parameter.

51. The wireless device of claim 43, wherein the decoding module includes a means for mapping the lengths of a group of broadcast packet in the series of broadcast packets to a number, the number encoding a portion of the network configuration parameter.

52. The wireless device of claim 43, wherein the decoding module includes a means for mapping the lengths of three or more broadcast packets in a group of broadcast packets to a value and an index number, the value representing a portion of the network configuration parameter and the index number indicating a position of the value within the network configuration parameter.

53. The wireless device of claim 43, wherein the network configuration parameter is a pre-shared secret key, shared between the wireless access point and the wireless device, said pre-shared secret key utilized by the configuration application in the operation to join the wireless network.

54. The wireless device of claim 43, wherein the operation to join the wireless network includes utilizing the pre-shared secret key to authenticate the wireless device.

55. The wireless device of claim 43, wherein the operation to join the wireless network includes utilizing the pre-shared secret key to associate the wireless device with the wireless access point.

56. The wireless device of claim 43, further comprising:
a camera to capture images; and
a storage component to store the images, wherein said wireless communications module is to wirelessly send images, through the access point to a computing device communicatively coupled to the access point.

57. The wireless device of claim 43, wherein the wireless communications module, the decoding module, and the configuration application are embedded in a detachable media card.

* * * * *